(12) United States Patent
Chang

(10) Patent No.: US 6,401,892 B1
(45) Date of Patent: Jun. 11, 2002

(54) SIGNAL WIRING ELASTIC REWINDING DEVICE

(76) Inventor: Hsi-Fan Chang, P.O. Box, No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/669,921

(22) Filed: Sep. 27, 2000

(51) Int. Cl.[7] .............................................. H02G 11/02
(52) U.S. Cl. .................................................... 191/12.4
(58) Field of Search ......................... 191/12 R, 12.2 R, 191/12.4

(56) References Cited

U.S. PATENT DOCUMENTS

| | | | | |
|---|---|---|---|---|
| 5,718,310 A | * | 2/1998 | Gallo | 191/12.2 R |
| 6,135,254 A | * | 10/2000 | Liao | 191/12.4 |
| 6,176,358 B1 | * | 1/2001 | Hsin | 191/12.2 R |
| 6,253,893 B1 | * | 7/2001 | Chi-Min | 191/12.4 |

* cited by examiner

*Primary Examiner*—S. Joseph Morano
*Assistant Examiner*—Robert J. McCarry, Jr.
(74) *Attorney, Agent, or Firm*—Troxell Law Office PLLC

(57) ABSTRACT

A signal wiring elastic rewinding device comprised of a case, a reel, a spring component, a lock button, and signal wiring. The case consists of an upper case half and a lower case half that are assembled together. A plug receptacle and an opening are formed in the lateral end at the upper section and, furthermore, a containment recess is formed at the lower section of the opening and an opening is formed in another lateral end at the lower section of the case. This provides for winding the signal wiring around the reel such that after the reel is installed on a projecting shaft inside the case, the ends of signal wiring extend respectively from the two lateral openings. The spring component controls the direction of the signal wiring on the reel and allows the unrestrained pulling out of an appropriate length of signal wiring for utilization and, furthermore, the elastic and rapid rewinding of the signal cable by the signal wiring elastic rewinding device of the present invention, which effectively facilitates convenient signal cable dispensing and storage.

1 Claim, 5 Drawing Sheets

SIGNAL WIRING ELASTIC REWINDING DEVICE

BACKGROUND OF THE INVENTION

1. Field of the Invention

The invention herein relates to a signal wiring elastic rewinding device design, specifically a design for telephone signal transmission applications and in which the said reel device structure is capable of orderly signal wiring rewinding to facilitate the unrestrained pulling out of an appropriate length of signal wiring for utilization and, furthermore, a spring-loaded rewinding structure capable of the rapid storage of the signal wiring.

2. Description of the Prior Art

Conventional indoor telephone sets have transmission signal wiring plugged in at the rear ends and when the said signal wiring is moved and tugged upon, since most telephone sets are located and installed in corners, it is very difficult for users to freely move indoor telephones, and allowing the signal wiring to be spread about on the floor is inappropriate. As for the signal wiring between the telephone and its telephone transmitter, the conventional versions observed are coiled in form and overly lengthy signal wiring is shortened such that when the user grasps the telephone transmitter, the coiled signal wiring appropriately extends to allow the user to speak within a fixed range; however, after the said coiled signal wiring is utilized a number of times, the varying handling or stretching habits of the user leads to the deforming or kinking of the coiled structure of the signal wiring which not only increases the difficulty of pulling the signal wiring when the user grasps the telephone transmitter, but easily causes internal wiring breakage and shorting due the kink-induced twisting which ultimately culminates in unclear telephone signals. As such, the design of the signal wiring at the rear side of the conventional telephones or the signal wiring between them and the telephone transmitters still does not provide unrestrained dispensing and, furthermore, orderly rewinding performance, which constitutes a shortcoming.

SUMMARY OF THE INVENTION

The primary objective of the invention herein is to provide a signal wiring elastic rewinding device design in which a reel is installed in the interior section of the case of the rewinding device and a length of signal wiring is wound within the case such that two ends of the said signal wiring extend respectively from two lateral openings of the case, thereby providing the user the unrestrained pulling out of an appropriate length of signal wiring from the area of the openings for installation and utilization; furthermore, a design wherein a spring component controls the reel such that when the user desires the provided rewinding of the signal wiring, the spring component rotates the reel in the opposite direction to rapidly rewind the signal wiring; as such, when the present invention is installed on a telephone set, in addition to allowing the user the unrestrained dispensing of the signal wiring for telephone movement, the orderly rewinding of the signal winding is also afforded.

Another objective of the invention herein is to provide a signal wiring elastic rewinding device design, wherein plug receptacles are formed in the two lateral opening areas of the said case to provide for the insertion and securing of the plugs at the end sections of the signal wiring.

Yet another objective of the invention herein is to provide a signal wiring elastic rewinding device design, wherein a containment recess can be additionally formed in one designated side of the said case to provide for the placement of a connection terminal.

DETAILED DESCRIPTION OF THE PREFERRED EMBODIMENTS

Figure 1:
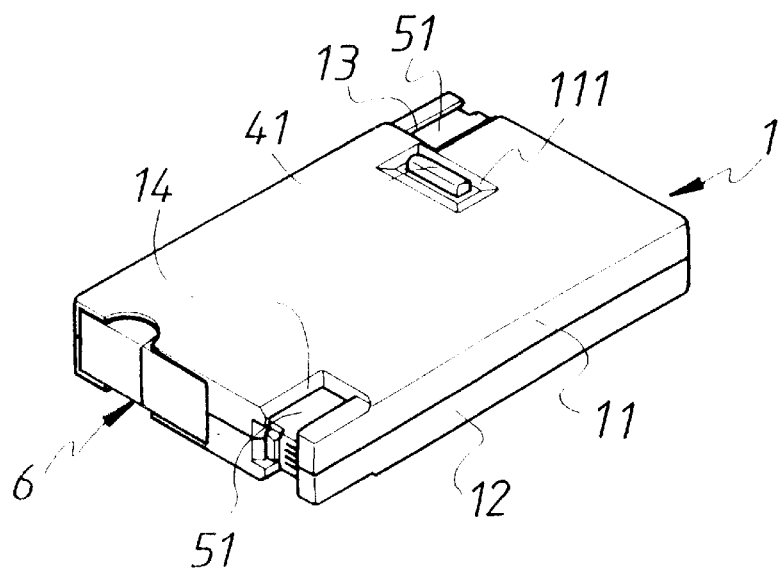
FIG. 1 is an isometric drawing of the invention herein.
Figure 2:
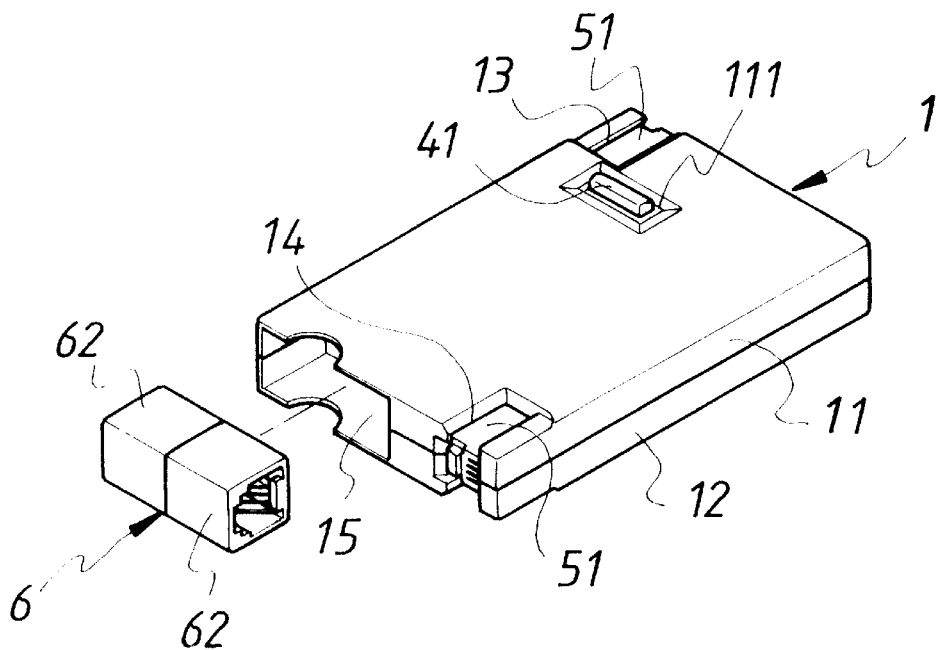
FIG. 2 is an isometric drawing of the connection terminal placement position of the invention herein.

Referring to FIG. 1 and FIG. 2, the signal wiring elastic rewinding device design of the invention herein is comprised of a case 1, a reel 2, a spring component 3, a lock button 4, signal wiring 5, and a connection terminal 6.

Figure 3:
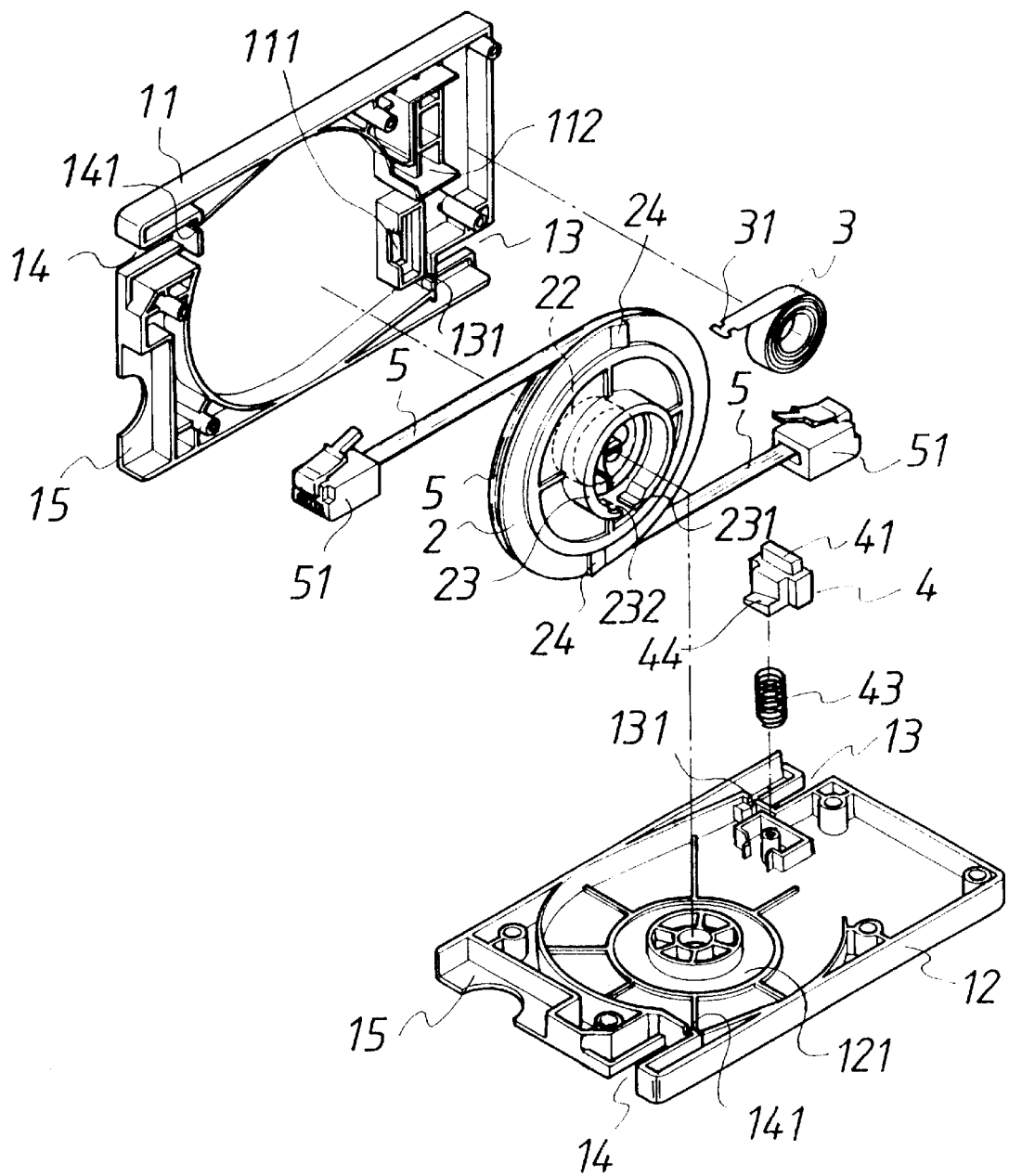
FIG. 3 is an exploded drawing of the invention herein.

The case 2 consists of an upper case half 11 and a lower case half 12 that are assembled together into a hollow enclosure (as shown in FIG. 1 and FIG. 2); an inset plug receptacle 13 is formed in the lateral end at the lower exterior section of the case 1 and, furthermore, an opening 131 is formed in the bottom of the plug receptacle 13 that is contiguous with its interior section (as shown in FIG. 3) and a plug receptacle 14 is formed in another lateral end at the upper section and similarly, there is an opening 141 in the bottom, however an indented oblong-shaped containment recess 15 is additionally formed at the bottom section; situated at a designated appropriate area of the interior section and top surface of the case 1 structure is a rectangular through-hole 111 that is contiguous with the exterior section and there is a rectangular slot 112 at one side of the said through-hole 111; situated at a designated appropriate area in the interior section of the lower case half 12 is a projecting shaft 121 that provides for the installation of the reel 2 described below.

The reel 2 (as shown in FIG. 3) is a round disk having two protruding concentric inner and outer circular rings 21 and 22 disposed at the center of the disk surface, with two notches 221 selectively formed in the radius of the said outer circular ring 22 that are symmetrically placed on the outer circular ring 22; protruding from the center of the bottom surface of the reel 2 is larger diameter annular projection 23 and formed at a designated area of the annular projection 23 wall is a single notch 231 and, furthermore, situated at one side of the notch 231 is a hook slot 232; situated on the bottom surface peripheral area of the reel 2 are two selectively located and circumference oriented, angled teeth 24 and the two angled teeth 24 are correspondingly positioned.

The spring component 3 is a tensile metal band of circular shape that is tightly wound into an ring-shaped structure, the tail of the band at the innermost winding is the unfixed free end and disposed on the head of the band at the outer periphery of the windings is a T-shaped tip 31 such that drawing out the head of the band causes the non-binding tightening of the ring-shaped structure and, furthermore, the subsequent rewinding of the spring component 3 due to its elasticity.

The lock button 4 is a block of projecting contour having a press top 41 at the upper end and a blind hole 42 formed in the bottom surface, and a compression spring 43 is installed in the blind hole 42; however, an upwardly profiled angled tooth 44 is situated on a designated single side of the lock button 4.

The signal wiring 5 consists of numerous metal strands of electrically conductive lines arrayed and covered in an interior section with a plug 51 disposed at each end; however, since the signal wiring 5 and the plugs 51 are conventional articles, they are not further elaborated.

Figure 4:
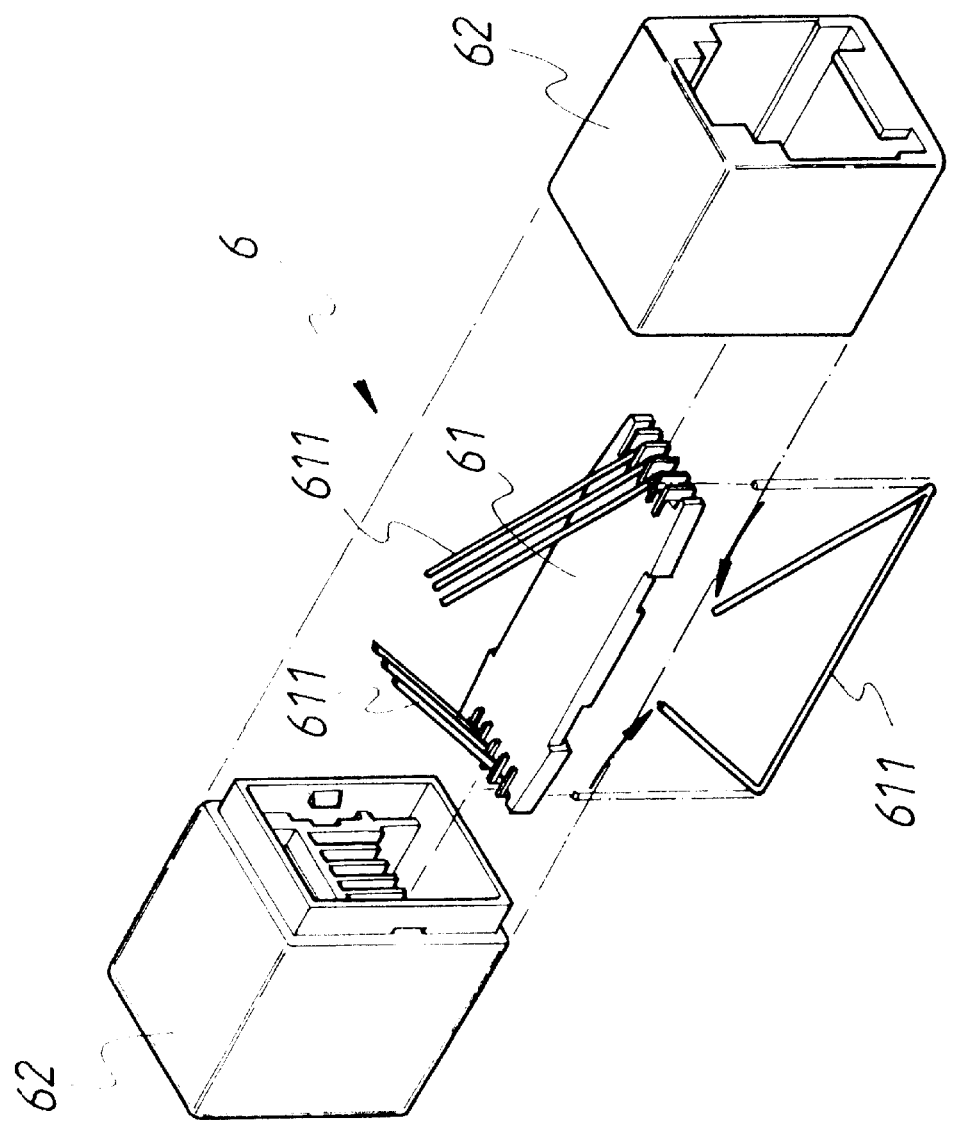
FIG. 4 is an exploded drawing of the connection terminal in the invention herein.

The connection terminal 6 (as shown in FIG. 4) consists of a transition mount 61 and two guide sleeves 62, with the flat rectangular transition mount 61 having a plurality of metal conductors 611 inserted from the bottom section and, furthermore, bent into an angular arrangement around the two sides of the upper surface of the transition mount 61; the guide sleeves 62 are of an oblong tubular shape and ensleeved onto the two ends of the transition mount 61 and, furthermore, conjoins the two guide sleeves 62, thereby providing for the insertion of the signal wiring 5 plugs 51 into the guide sleeves 62 to achieve connectivity; however, as these is not the main content of the invention herein, therefore, they not further elaborated.

Figure 5:
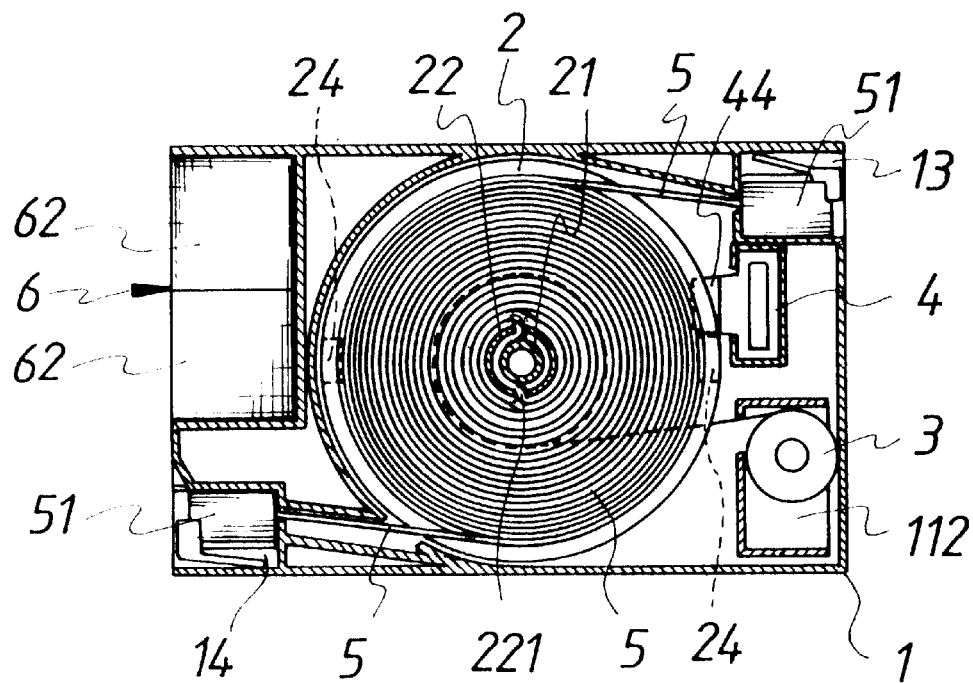
FIG. 5 is a cross-sectional drawing of the assembled structure of the invention herein.
Figure 6:
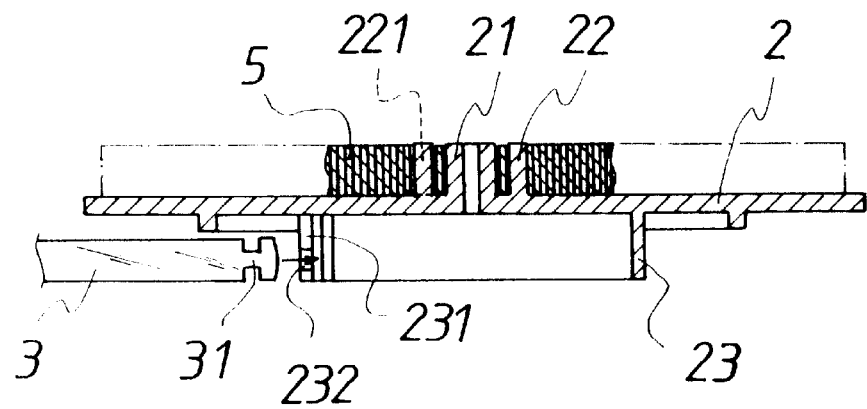
FIG. 6 is a cross-sectional drawing of the reel of the invention herein.
Figure 7:
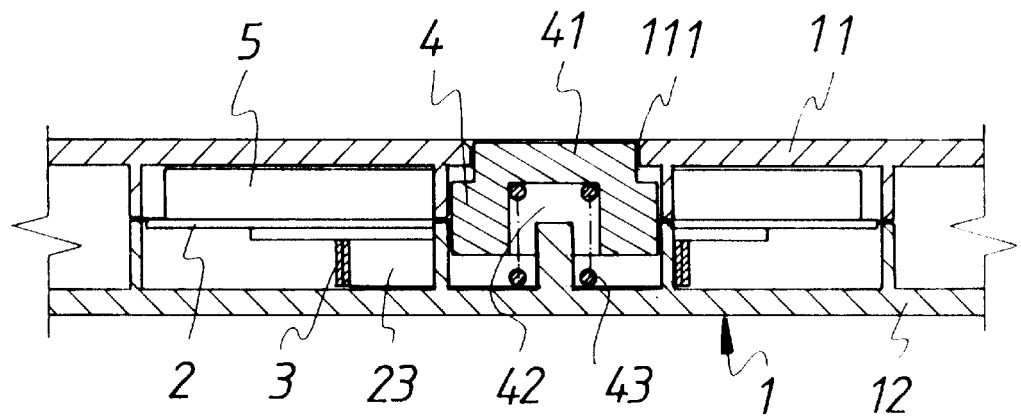
FIG. 7 is an orthographic drawing of the lock button assembly of the invention herein.
Figure 8:
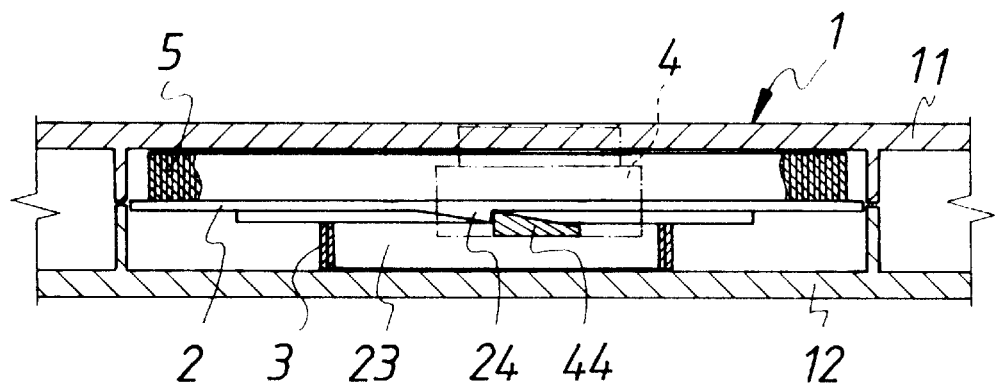
FIG. 8 is an orthographic drawing of the lock button engaging the reel in the invention herein.

As such, a designated area of the center section of the said signal wiring 5 is inserted into two notches 221 in the top surface of the outer circular ring 22 (as shown in FIG. 3 and FIG. 5) to enable the clipping of the signal wiring 5 inside the inner and outer circular rings 21 and 22 and then its extension outward from the two exterior sides of the outer circular ring 22 and, furthermore, the signal wiring 5 is wound in the same direction around the outer circular ring 22; as such, the annular projection 23 at the bottom surface of the reel 2 is utilized to sleeve it onto the projecting shaft 121 at the lower case half 12 of the case 1 such that the reel 2 is enclosed by the case 1 in a rotatable state and, furthermore, the two ends of the signal wiring 5 extend respectively from the openings 131 and 141, enabling the plugs 51 to be installed outside the case 1. The spring component 3 is positioned in the rectangular slot 112 of the upper case half 11 of the case 1 and, furthermore, the T-shaped tip 31 for drawing out the spring component 3 is nested within the hook slot 232 of the lower surface of the reel 2, and when the reel 2 is rotated in a positive direction to dispense the signal wiring 5, the spring component 3 is synchronously wound by the pulling action around the outer periphery of the annular projection 23 and the said lock button 4 (as shown in FIG. 7 and FIG. 8) is situated in the interior section of the through-hole 11 in the upper case half 11 with the compression spring 43 forcing it against the inner wall of the lower case half 12 such that the press top 41 of the lock button 4 extends to the exterior section via the though-hole 111 and, furthermore, one side of the angled protruding block 44 extends into the bottom surface of the reel 2 and correspondingly engages the angled teeth 24 to control the reel 2 while rotating in a positive direction to dispense the signal wiring 5 by preventing the spring component 3 from recoiling in the opposite direction and thereby maintaining the extension of the signal wiring 5 from the case 1 to the exterior section, which constitutes the signal wiring elastic rewinding device of the invention herein.

The effectiveness of the invention herein so constituted is that when the user pulls out the plug 51 at one end of the signal wiring 5, the other end of the signal wiring 5 is synchronously dispensed as the reel 2 rotates in a positive direction and, furthermore, the spring component 3 is drawn around the outer periphery of the annular projection 23, thereby providing the user the unrestrained pulling out of an appropriate length of signal wiring 5 for connection between a telephone and its telephone transmitter and, furthermore, the continuous pulling and extension the signal wiring 5 to provide the user easy indoor movement of the telephone or free movement of its telephone transmitter; since the reel 3 rotates in a positive direction during the dispensing of the signal wiring 5 and the protruding block 44 of the lock button 4 engages the angled teeth 24 of the reel 2, the reel 2 cannot be rotated in the reverse direction to any degree whatsoever by the spring component. 3.

Figure 9:
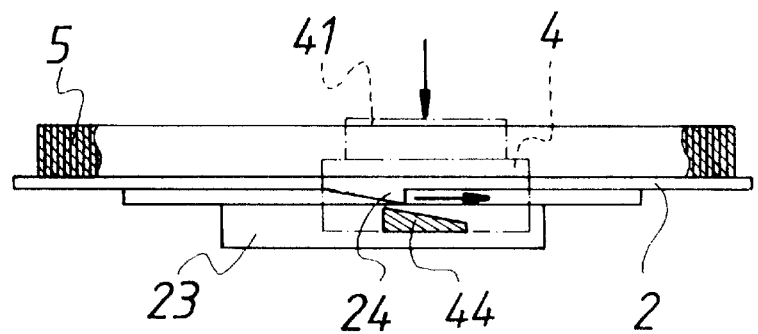
FIG. 9 is an orthographic drawing of the invention herein depicting the press operation of the lock button.

However, when the user rewinds the signal wiring 5, the press top 41 of the lock button 4 extending at the upper case half 11 is pushed down such that the lock button 4 descends and, furthermore, releases the state of engagement (as shown in FIG. 9), then the said reel 2 rewinds and rotates in the opposite direction due to the spring component 3, rapidly and orderly winding the signal wiring 5 inward and, furthermore, causing the plugs 51 to become neatly nested in the plug receptacles 13 and 14. As may be observed, the invention herein is a device that can be utilized for connecting a telephone set or for connecting a telephone set with its telephone transmitter that is capable of being conveniently pulled out and rapidly rewound to improve the said conventional shortcomings and provide progressive practicality.

In addition, the containment recess 15 in one side of the case 1 provides for the placement of the said connection terminal 6 when it is not utilized (as shown in FIG. 1 and FIG. 2) and illustrates that the invention herein is of an ingenious design. However, the overall composition of the present invention is not subject to limitations of actual utilization: circumstances or categories in that applications. such as a rear end line of a telephone set, modem line of a notebook computer, modem transmission line, and other similar uses are also included within its range of effectiveness.

What is claimed is:

1. A signal wire elastic rewinding device comprising:

a) a case including upper and lower case portions, the case having opposite end portions each having a plug receptacle, and one of the opposite end portions having a containment recess therein;

b) a reel rotatably located within the case, the reel including concentric inner and outer rings, the reel having at least one first wedge-shaped angled tooth extending therefrom;

c) a signal wire extending through slots in the concentric inner and outer rings and wound around the reel, the signal wire having two opposite wire ends extending from the opposite end portions of the case, each opposite wire end having a plug removably located in the plug receptacle;

d) a first spring acting between the case and the reel to bias the reel toward a wound position in which the signal wire is wound on the reel and the plugs are each located in the plug receptacles;

e) a lock button movably mounted on the case, the lock button having a press top located exteriorly of the casing and a second wedge-shaped angled tooth extending laterally therefrom, the lock button being movable between a first position, wherein the second, wedge-shaped angled tooth engages the first, wedge-shaped angled tooth to prevent movement of the reel toward the wound position, and a second position wherein the first and second wedge-shaped angled teeth are disengaged, thereby enabling movement of the reel toward the wound position;

f) a second spring acting on the lock button to bias the lock button toward the first position; and, g) at least one connection terminal removably stored in the containment recess and attachable to the plug of the signal wire.

* * * * *